(12) United States Patent
Bi et al.

(10) Patent No.: US 11,747,518 B2
(45) Date of Patent: Sep. 5, 2023

(54) SELF-BIASED MAGNETO-OPTICAL NON-RECIPROCAL METASURFACE DEVICE

(71) Applicant: University of Electronic Science and Technology of China, Chengdu (CN)

(72) Inventors: Lei Bi, Chengdu (CN); Weihao Yang, Chengdu (CN); Jun Qin, Chengdu (CN); Jiawei Long, Chengdu (CN); Longjiang Deng, Chengdu (CN)

(73) Assignee: UNIVERSITY OF ELECTRONIC SCIENCE AND TECHNOLOGY OF CHINA, Chengdu (CN)

( * ) Notice: Subject to any disclaimer, the term of this patent is extended or adjusted under 35 U.S.C. 154(b) by 401 days.

(21) Appl. No.: 17/200,944

(22) Filed: Mar. 15, 2021

(65) Prior Publication Data

US 2022/0082730 A1   Mar. 17, 2022

(30) Foreign Application Priority Data

Jan. 13, 2020   (CN) .......................... 202010031484.1

(51) Int. Cl.
*G02F 1/1335*   (2006.01)
*G02B 1/00*   (2006.01)
*G02F 1/13357*   (2006.01)

(52) U.S. Cl.
CPC ....... *G02B 1/002* (2013.01); *G02F 1/133606* (2013.01); *G02F 1/133504* (2013.01); *G02F 1/133541* (2021.01)

(58) Field of Classification Search
CPC ............. G02F 1/1335; G02F 1/133541; G02F 1/1336; G02F 1/133606; G02B 1/002; G02B 5/30; G02B 5/3085; H01Q 15/00
See application file for complete search history.

(56) References Cited

U.S. PATENT DOCUMENTS

2001/0038577 A1* 11/2001 Chang .................. G11B 7/1369
369/13.02

FOREIGN PATENT DOCUMENTS

CN   110391579   * 10/2019 ............... H01S 1/02

OTHER PUBLICATIONS

Patent Translate CN 110391579.*

* cited by examiner

*Primary Examiner* — Thoi V Duong
(74) *Attorney, Agent, or Firm* — MATTHIAS SCHOLL P.C.; Matthias Scholl

(57) ABSTRACT

The disclosure provides a self-biased magneto-optical non-reciprocal metasurface device. The device includes substrate layer and a sub-wavelength structure layer. The substrate layer is a material layer with a refractive index of 1 to 5 in a microwave frequency band. The sub-wavelength structure layer includes a plurality of square columnar elements arranged in a matrix period with equal period in row and column directions. The square columnar elements include magneto-optical material. The adjustment of phase and amplitude of a circularly polarized electromagnetic wave is achieved by changing the length, width and height of the square columnar elements, and thus the device attains a desired isolation and insertion loss at a center frequency $f_0$. The parameters of the magneto-optical material are: coercivity $Hc \geq 1000$ A/m; remanence $Br \geq 1$ kGs; a voigt parameter of a permittivity tensor or permeability tensor in a working frequency band $\geq 0.01$.

3 Claims, 2 Drawing Sheets

SELF-BIASED MAGNETO-OPTICAL NON-RECIPROCAL METASURFACE DEVICE

CROSS-REFERENCE TO RELATED APPLICATIONS

Pursuant to 35 U.S.C. § 119 and the Paris Convention Treaty, this application claims foreign priority to Chinese Patent Application No. 202010031484.1 filed Jan. 13, 2020, the contents of which, including any intervening amendments thereto, are incorporated herein by reference.

BACKGROUND

The disclosure relates to a non-reciprocal metasurface, and more particularly to a self-biased magneto-optical non-reciprocal metasurface device.

A metasurface is a two-dimensional sub-wavelength plate structure, which can effectively control the amplitude, polarization and wavefront of electromagnetic waves, which has become a research hotspot in recent years. Its main function is to realize various optical devices, such as lenses and glass slides, on a layer of interface. Compared with traditional optical devices, metasurfaces have sub-wavelength thickness and higher flexibility and thus is suitable for designing various electromagnetic wave devices. The non-reciprocal metasurface has attracted a lot of attention due to its important application in free space isolators.

At present, there are three main mechanisms that can achieve non-reciprocity: nonlinearity, time-modulation, and magneto-optical effect. Compared with non-linear and time-modulation systems, non-reciprocal devices based on the magneto-optical effect have the advantages of broadband, low power consumption, and stability. However, the disadvantage of the magneto-optical effect is that it requires a large magnet to provide a magnetic field and is difficult to achieve in the optical frequency band.

Although in the microwave and terahertz frequency bands, intensity-based nonreciprocal devices (with different transmission strengths) have been studied, but the existing intensity-based nonreciprocal devices based on the magneto-optical effect are only studied theoretically. The devices require a large magnet to provide an external magnetic field, which is an active device and is restricted to be used in a specific space. Compared with the magneto-optical non-reciprocal devices that require an external bias, self-biased devices do not require an external magnet to provide a magnetic field. They are passive devices and can be used in free space. The self-biased magneto-optical non-reciprocal device has not been studied theoretically and experimentally.

SUMMARY

To solve the problems that the existing magneto-optical effect non-reciprocal devices only stay at the theoretical stage and have extremely low practicality, the disclosure provides a self-biased magneto-optical non-reciprocal metasurface device.

The self-biased magneto-optical non-reciprocal metasurface device comprises a substrate layer and a sub-wavelength structure layer.

The substrate layer is a material layer with a refractive index of 1 to 5 in the microwave frequency band. The sub-wavelength structure layer comprises square columnar elements arranged in a matrix period with equal period in the row and column directions. The material of elements is magneto-optical material. The adjustment of phase and amplitude of the circularly polarized electromagnetic wave is achieved by changing the length, width and height of the element, and thus the device attains the desired isolation and insertion loss at the center frequency $f_0$.

The parameters of magneto-optical material are:
coercivity Hc≥1000 A/m; remanence Br≥1 kGs; the voigt parameter of the permittivity tensor or permeability tensor in the working frequency band≥0.01.

Self-biased work state is achieved by utilizing the remanence, and the magneto-optical effect provides non-reciprocity.

The thickness of the substrate layer is L, the elements have a height of h, a length of $w_1$, and a width of $w_2$. The elements are arranged to form a matrix array with equal row and column periods p. The device size is $D_1 \times D_2$. The device responds to circularly polarized incident electromagnetic waves. The dimensions satisfy the relationship: $w_1 \leq 10$ mm, $w_2 = 0.75\ w_1 - 1.25\ w_1$, $h = w_1 - 3\ w_1$, $p = 3\ w_1 - 4\ w_1$, $L = 1/2\ w_1 - 2\ w_1$, $D_1 = 10\lambda_0 - 15\lambda_0$, $D = 10\lambda_0 - 15\lambda_0$, $\lambda_0 = c/f_0$, c is the speed of light in vacuum.

The thickness of the entire device is in the sub-wavelength dimension. The entire device requires magnetization only once to ensure the remanence direction is parallel to the incident electromagnetic wave direction.

Further, the magneto-optical material is ferrite or Yttrium iron garnet (YIG), and the substrate layer comprises polytetrafluoroethylene.

The disclosure following advantages are associated with the device of the disclosure:

The main features of the non-reciprocal metasurface device of the disclosure are: self-biasing, hard magnetic materials, dispenses with continuous external magnetic field. At the same time, the entire device with sub-wavelength dimension is beneficial to the miniaturization and integration of the device.

In the disclosure, the elements are periodically arranged in a matrix on the material layer, which has a refractive index of 1 to 5 in the microwave frequency band. The phase and amplitude of the electromagnetic wave are controlled by changing the length, width and height of the elements. The device requires magnetization only once and no continuous external magnetic field needed. Finally, the disclosure realizes a self-biased magneto-optical non-reciprocal device through a high-coercivity hard magnetic material based on the magneto-optical effect. At the same time, the entire device with sub-wavelength dimension is beneficial to the miniaturization and integration of the device. It has important application prospects in radar shielding (unidirectional transmission), free space isolators, non-reciprocal lenses, non-reciprocal holographic imaging and other fields.

DETAILED DESCRIPTION

To further illustrate the disclosure, embodiments detailing a self-biased magneto-optical non-reciprocal metasurface device are described below. It should be noted that the following embodiments are intended to describe and not limit disclosure.

As described in the background section, the feasible solutions for realizing non-reciprocal metasurfaces mainly include nonlinearity, time-modulation and magneto-optical effects. Non-reciprocal devices based on nonlinearity require very high input power and have dynamic reciprocity problems; non-reciprocal devices based on time-modulation systems have large power consumption, narrow bandwidth and relatively large device sizes; non-reciprocal devices based on magneto-optical effects require a large magnet to provide a magnetic field and are difficult to achieve in the optical band. The advantages of the magneto-optical effect are broadband, low power consumption, and stability. Therefore, the realization of a self-biased magneto-optical non-reciprocal metasurface device is of great significance.

In this example, a self-biased intensity-type metasurface device operates under circularly polarized electromagnetic waves.

The self-biased intensity-type metasurface device includes a substrate layer with a thickness of L; the elements have a height h, length $w_1$ and width $w_2$, and a period p, and the entire device size is D1×D2. The device responds to circularly polarized incident electromagnetic waves. The direction of residual magnetization is parallel to the incident direction of electromagnetic waves. The adjustment of phase and amplitude of the circularly polarized electromagnetic wave is achieved by changing the length, width and height of the element, and thus the device attains the desired isolation and insertion loss at the center frequency $f_0$.

The hexagonal barium ferrite material with high coercivity and magneto-optical effect in the microwave frequency band is used as the elements, and the remanence is used to realize self-bias. At the same time, the square column with high direction ratio is used as the form of elements for circularly polarized electromagnetic wave. By designing the Mie resonator unit with sub-wavelength periodic structure, the unidirectional transmission function of circularly polarized electromagnetic wave is realized.

Figure 1:
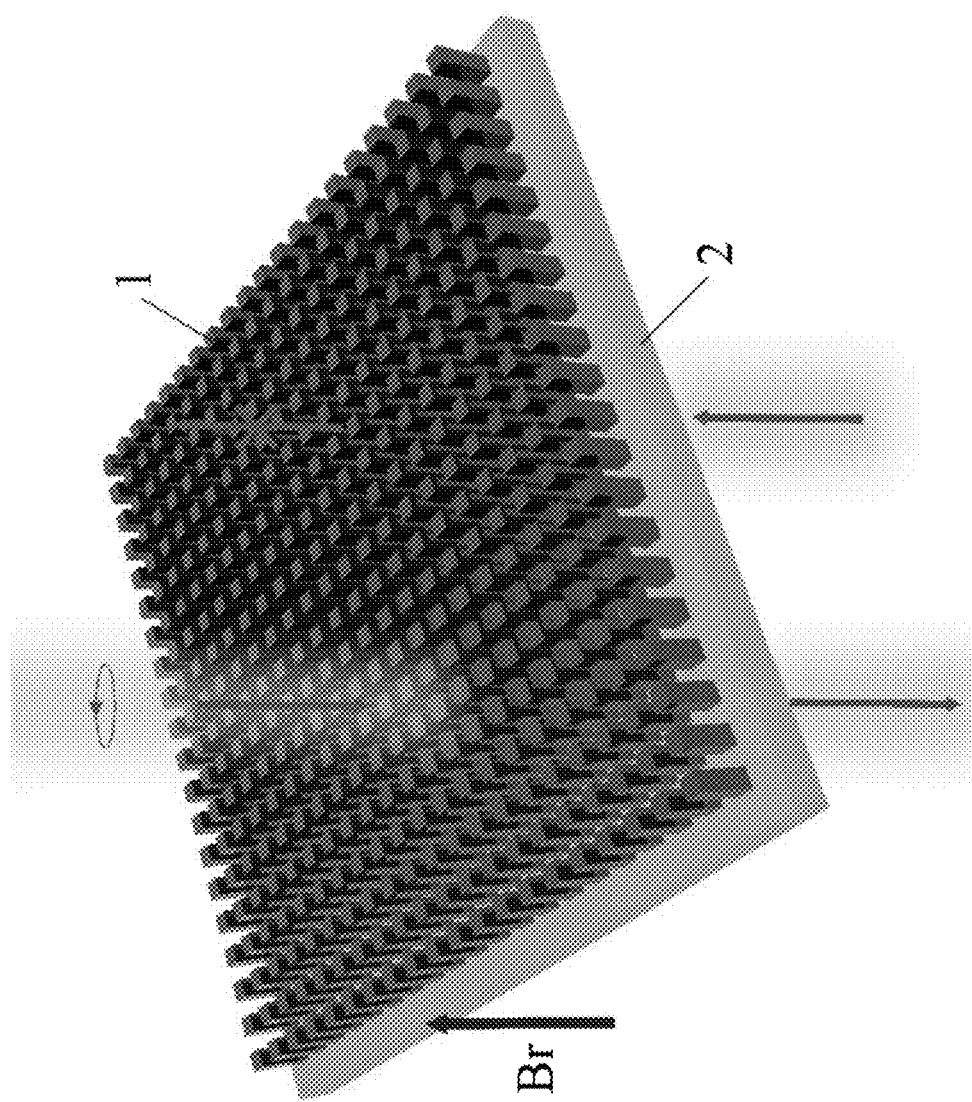
FIG. 1 is a schematic diagram of an intensity-type non-reciprocal metasurface device working under circularly polarized electromagnetic waves.

In certain embodiments, the circularly polarization intensity-type device comprises a polytetrafluoroethylene (PTFE) substrate layer with a thickness of 2 mm; and the matrix array comprises square columnar hexagonal barium ferrite material with a height of h=6 mm, a width of $w_1=w_2=3$ mm, and a period of p=10 mm. The device size is 20×20 cm. The device responds to circularly polarized incident electromagnetic waves. The schematic structure of the device is shown in FIG. 1. The direction of residual magnetization is parallel to the incident direction of electromagnetic waves, that is, along the height direction of the hexagonal barium ferrite material.

Figure 2:
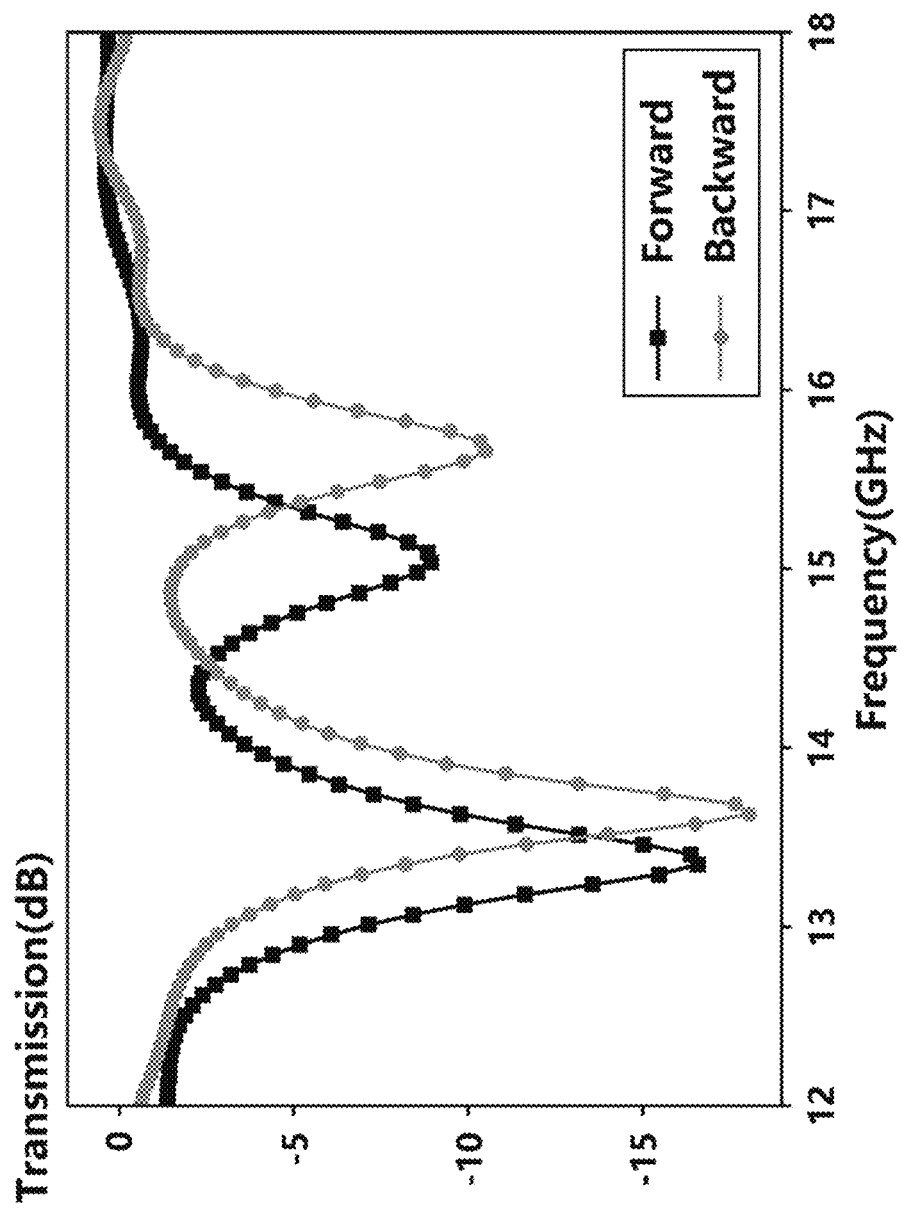
FIG. 2 shows the forward and reverse transmission spectra of an intensity-type non-reciprocal metasurface device working under circularly polarized electromagnetic waves.

Testing and analysis of the device prepared in this Example: the function of unidirectional transmission with isolation of 9.18 dB and insertion loss of 1.35 dB at 15.67 GHz is observed, as shown in FIG. 2.

In summary, when electromagnetic waves are incident on the magnetic elements with remanence of the disclosure, due to the non-reciprocity of the materials, the amplitude and phase of the forward and the reverse electromagnetic waves are different. Moreover, only one magnetization is required, and dispenses with continuous external magnetic field. The entire device with sub-wavelength dimension is conducive to the miniaturization and integration of the device. This device has important application prospects in radar shielding (unidirectional transmission), free space isolators, non-reciprocal lenses, non-reciprocal holographic imaging and other fields.

It would be obvious to those skilled in the arts that changes and modifications may be made; therefore, the aim of the appended claims is to cover all such changes and modifications.

What is claimed is:

1. A device, comprising:
a substrate layer; and
a sub-wavelength structure layer;
wherein:
the substrate layer is a material layer with a refractive index of 1 to 5 in a microwave frequency band;
the sub-wavelength structure layer comprises a plurality of square columnar elements arranged in a matrix period with equal period in row and column directions;
the square columnar elements comprise a magneto-optical material;
adjustment of phase and amplitude of a circularly polarized electromagnetic wave is achieved by changing the length, width and height of the square columnar elements, and thus the device attains a desired isolation and insertion loss at a center frequency $f_0$;
parameters of the magneto-optical material are:
coercivity Hc≥1000 A/m; remanence Br≥1 kGs; a voigt parameter of a permittivity tensor or permeability tensor in a working frequency band≥0.01;
self-biased work state is achieved by utilizing the remanence, and a magneto-optical effect provides non-reciprocity;
a thickness of the substrate layer is L, the square columnar elements have a height of h, a length of $w_1$ and a width of $w_2$; the square columnar elements are arranged to form a matrix array with equal row and column periods p; the device size is $D_1 \times D_2$; the device responds to circularly polarized incident electromagnetic waves; dimensions of the device satisfy the relationship: $w_1 \leq 10$ mm, $w_2=0.75\ w_1-1.25\ w_1$, $h=w_1-3\ w_1$, $p=3\ w_1-4\ w_1$, $L=1/2\ w_1-2\ w_1$, $D_1=10\lambda_0-15\lambda_0$, $D_2=10\lambda_0-15\lambda_0$, $\lambda_0=c/f_0$, and c is a speed of light in vacuum; and
a thickness of the device is sub-wavelength; the device is magnetized only once; and a remanence direction is parallel to an incident electromagnetic wave direction.

2. The device of claim 1, wherein the magneto-optical material comprises ferrite or Yttrium iron garnet (YIG).

3. The device of claim 1, wherein the substrate layer comprises polytetrafluoroethylene.

* * * * *